United States Patent
Joshi et al.

(10) Patent No.: US 12,298,855 B2
(45) Date of Patent: May 13, 2025

(54) PRESENTING BOOT PARTITION AS DEVICE FIRMWARE

(71) Applicant: DELL PRODUCTS L.P., Round Rock, TX (US)

(72) Inventors: Anand Joshi, Round Rock, TX (US); Daniel Hamlin, Round Rock, TX (US); Ibrahim Sayyed, Georgetown, TX (US)

(73) Assignee: Dell Products L.P., Round Rock, TX (US)

(*) Notice: Subject to any disclaimer, the term of this patent is extended or adjusted under 35 U.S.C. 154(b) by 108 days.

(21) Appl. No.: 18/362,663

(22) Filed: Jul. 31, 2023

(65) Prior Publication Data

US 2025/0045164 A1 Feb. 6, 2025

(51) Int. Cl.
*G06F 11/00* (2006.01)
*G06F 11/07* (2006.01)
*G06F 11/14* (2006.01)

(52) U.S. Cl.
CPC ...... *G06F 11/1417* (2013.01); *G06F 11/0793* (2013.01)

(58) Field of Classification Search
CPC .......... G06F 11/1417; G06F 11/0793
USPC .......................................... 714/36
See application file for complete search history.

(56) References Cited

U.S. PATENT DOCUMENTS

| | | | |
|---|---|---|---|
| 10,747,526 B2 | 8/2020 | Samuel et al. | |
| 11,416,327 B2 | 8/2022 | Sayyed et al. | |
| 2017/0270301 A1* | 9/2017 | Vidyadhara | G06F 9/4411 |
| 2020/0348946 A1* | 11/2020 | Pant | G06F 11/1417 |
| 2021/0048997 A1 | 2/2021 | Samuel et al. | |
| 2024/0289223 A1* | 8/2024 | Feng | G06F 11/0709 |

* cited by examiner

*Primary Examiner* — Jason B Bryan
(74) *Attorney, Agent, or Firm* — Larson Newman, LLP

(57) ABSTRACT

An information handling system scans an extensible firmware interface system partition for a file path. If the file path is missing, the system determines information associated with the file path, and adds an entry in an extensible firmware interface system resource table based on the information associated with the file path.

19 Claims, 4 Drawing Sheets

PRESENTING BOOT PARTITION AS DEVICE FIRMWARE

FIELD OF THE DISCLOSURE

The present disclosure generally relates to information handling systems, and more particularly relates to presenting boot partition as device firmware.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system scans an extensible firmware interface system partition for a file path. If the file path is missing, the system determines information associated with the file path, and adds an entry in an extensible firmware interface system resource table based on the information associated with the file path.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
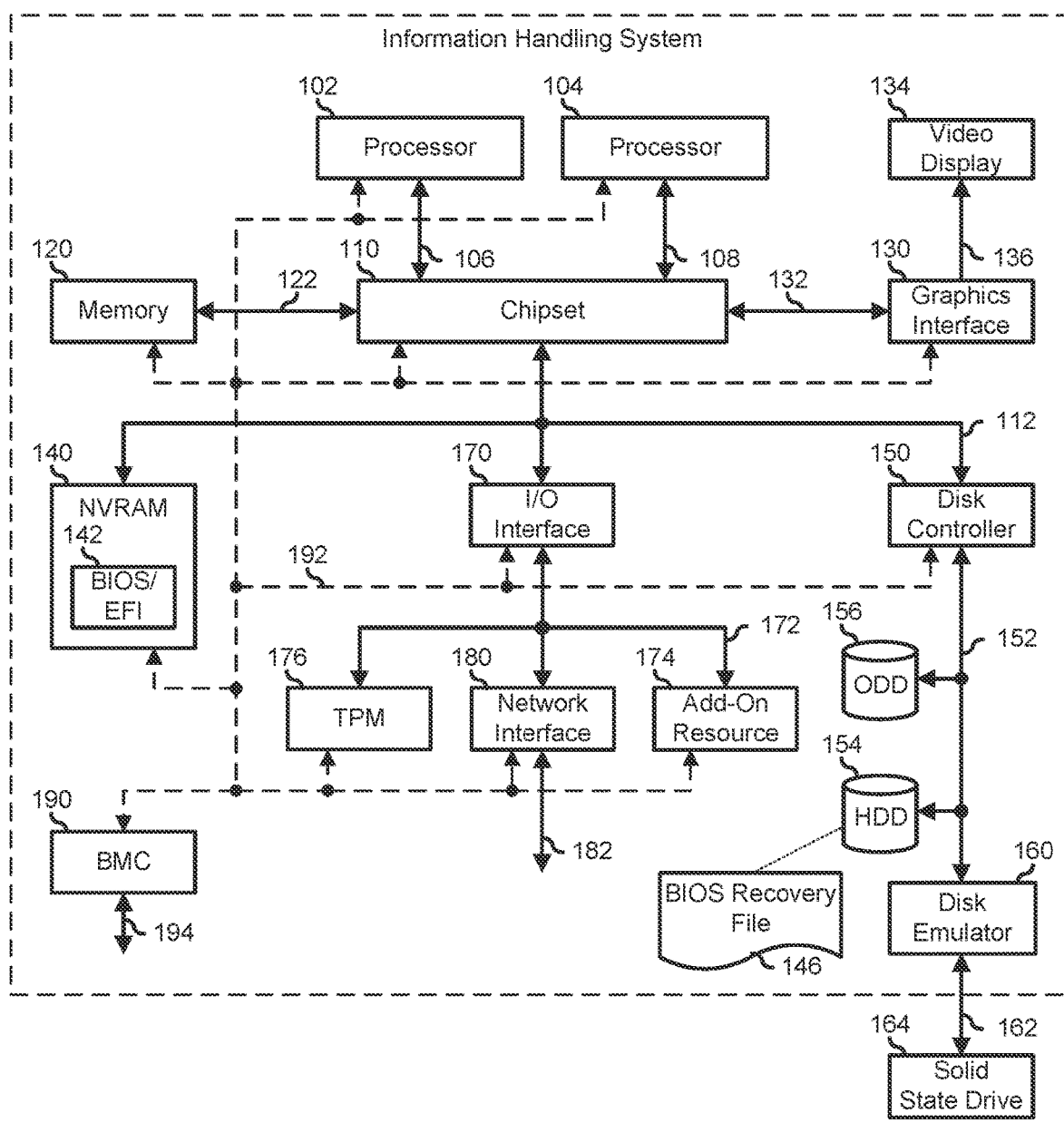
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface, a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100. A BIOS recovery file 146 may be stored in a hidden partition of a storage device, such as HDD 154. BIOS recovery file 146 may be a file that can be used to restore BIOS/EFI module 142.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include a I2C bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

BIOS recovery files, similar to BIOS recovery file 146 in FIG. 1, that are used for restoring an information handling system from power-on self-test (POST) errors are typically stored in an EFI system partition. In cases where the information handling system experiences a no post no-video (NP-NV) error, the BIOS recovery files are generally required to bring the information handling system back to a functional state. Unfortunately, there have been incidents where the recovery of the information handling system has failed due to missing BIOS recovery files. This can occur for various reasons such as a data wipe, custom USB-driven operating system installation, or the installation of non-unified extensible firmware interface (UEFI) supported operating systems.

When the system encounters an NP-NV error, there is generally no current solution to retrieve the BIOS recovery files and restore them to the EFI system partition. Restoration at this point may require clearing and using a pre-operating system network foundation at a driver execution environment (DXE) phase of the POST. As a result the NP-NV situation often results in a service call and may require a customer to ship the information handling system to its manufacturer for repair. To address these and other concerns, the present disclosure provides a system and method for evaluating system parameters and providing notification to an operating system service to obtain, configure and restore system settings to allow for an intelligent recovery process.

Figure 2:
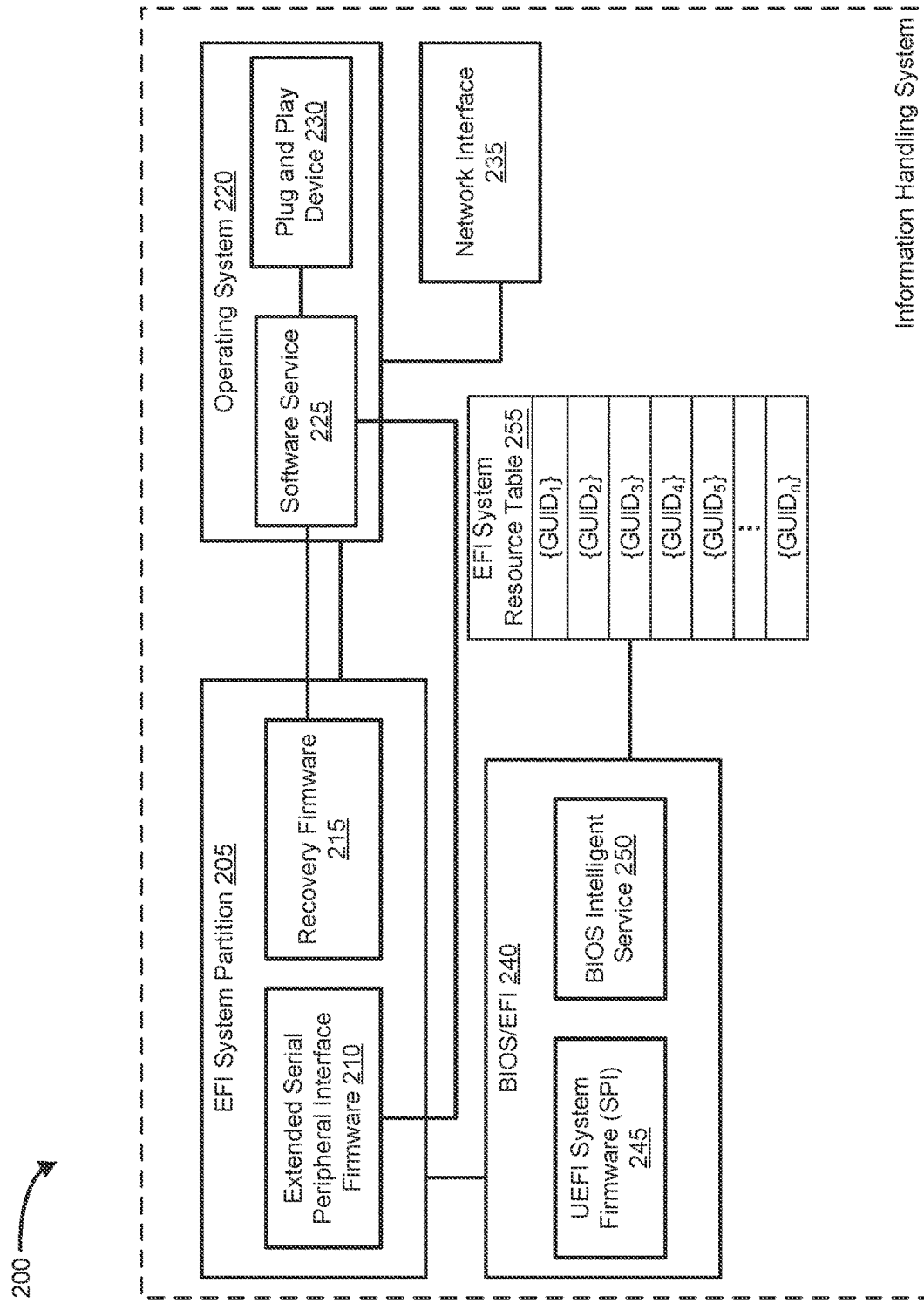
FIG. 2 is a diagram of an information handling system configured for automated system recovery and execution of remediation events, according to an embodiment of the present disclosure.

FIG. 2 shows an information handling system 200 that is configured for automated system recovery and execution of remediation events. Information handling system 200 may be similar to information handling system 100 of FIG. 1 and includes an EFI system partition 205, an operating system 220, a network interface 235, a BIOS/EFI 240, and an EFI system resource table 255. BIOS/EFI 240 which is similar to BIOS/EFI 142 of FIG. 1 includes a UEFI system firmware (SPI) 245 and a BIOS intelligent service 250. Operating system 220 may be a host operating system, such as a Windows operating system, of information handling system 200. Operating system 220 includes a software service 225 and plug-and-play device 230.

EFI system partition 205 may be configured as a partition on a storage device that can be used for storing startup files, operating systems, recovery data, or other critical files. EFI system partition 205 includes an extended SPI firmware 210 and a recovery firmware 215. Recovery firmware 215 may be used to recover BIOS/EFI 240, such as when a POST or a system boot issue is encountered.

Software service 225 may be a combination of a kernel driver and software that is configured as a firmware update service included in operating system 220. Software service 225 may use identifiers in EFI system resource table 255 to determine which firmware updates are applicable for a given target. Accordingly, software service 225 may push a firmware update package for a given target whenever a new version that is applicable is available. Software service 225 may determine whether a firmware update package is applicable by comparing a globally unique identifier (GUID) in a setup information file in the firmware update package to a GUID in EFI system resource table 255. The GUID may identify a file or firmware component that can be updated via an update package. In particular, the GUID may identify a system firmware or a device firmware.

BIOS intelligent service 250 may be configured as a UEFI service that tracks an absence of one or more BIOS recovery files, BIOS firmware images, and/or associated file paths, wherein the aforementioned files, images, and file paths may be located in EFI system partition 205. If the aforementioned files or file paths are missing or outdated, an entry may be created in EFI system resource table 255 via UEFI system firmware (SPI) 245. EFI system resource table 255 may be configured to provide a mechanism for identifying integrated devices and system firmware resources for firmware updates. Each entry in EFI system resource table 255 may describe a device firmware or a system firmware resource that can be targeted by a firmware update driver package.

BIOS intelligent service 250 may populate EFI system resource table 255 with a GUID, such as a hardware identifier that is embedded in the firmware identifier GUID. In addition, BIOS intelligent service 250 may also include other information such as firmware class, firmware type, firmware version, lowest supported version, etc. In particular, if BIOS intelligent service 250 detects an issue with recovery firmware 215 or other files or file paths, then BIOS intelligent service 250 may create a device entry in EFI system resource table 255 for updating recovery firmware 215. For example, BIOS intelligent service 250 may determine that recovery firmware 215 is missing. The entry in EFI system resource table 255 may direct operating system 220 or software service 225 to enumerate a separate plug-and-play device, such as plug-and-play device 230 for recovery firmware 215. If there are two or more entries, then operating system 220 may enumerate a separate plug-and-play device for each entry. This allows for an automated BIOS recovery and execution of remediation events without user intervention or impact. Further, by using the EFI system resource table 255 and plug-and-play device instances, firmware restoration as firmware updates can be targeted to specific devices and system firmware resources, allowing for a more efficient and accurate firmware restore on the EFI system partition 205.

Network interface 235 may be any suitable system, apparatus, or device operable to serve as an interface between operating system 220 or in particular, software service 225. Network interface 235 may enable software service to communicate using any suitable transmission protocol and/or standard. In these and other embodiments, a network interface may include a network interface card.

Those of ordinary skill in the art will appreciate that the configuration, hardware, and/or software components of information handling system 200 depicted in FIG. 2 may vary. For example, the illustrative components within information handling system 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
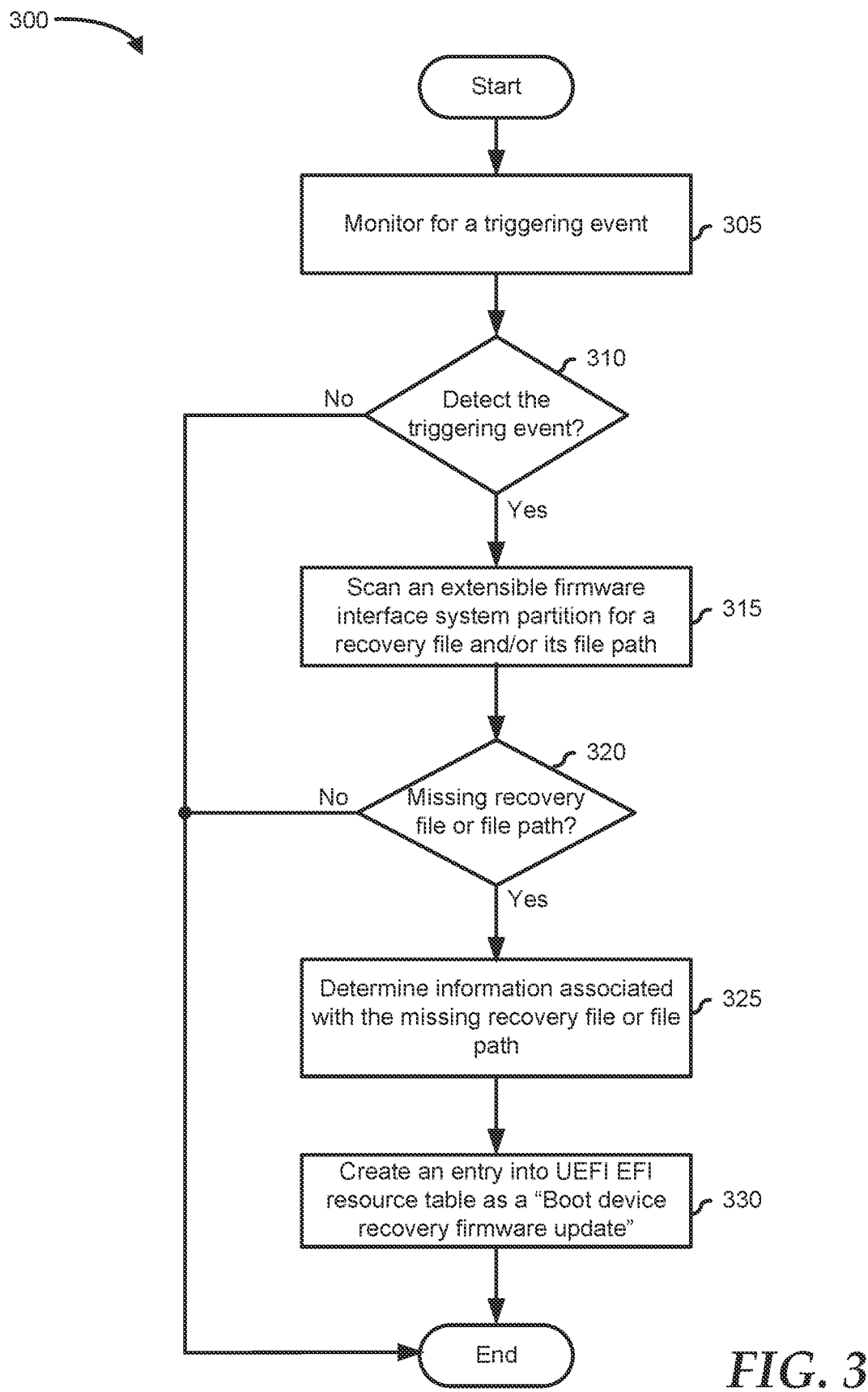
FIG. 3 is a flowchart of a method for tracking system recovery files and notifying an operating system of missing recovery files, according to an embodiment of the present disclosure.

FIG. 3 shows a flowchart of a method 300 for tracking system recovery files and notifying the operating system of missing recovery files. Method 300 may be performed by one or more components of information handling system 200 of FIG. 2. For example, one or more blocks of method 300 may be performed by BIOS/EFI 240, UEFI system firmware (SPI) 245, and/or BIOS intelligent service 250. However, while embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 300 typically starts at block 305 wherein at system power on, BIOS/EFI 240 initialization process starts. During the initialization process, a BIOS intelligent service may monitor for an event that can trigger it to scan an EFI system partition for one or more BIOS recovery files or their file paths. For example, the event can include interruption to a system boot, and when a specified threshold number of system boots is reached.

The method may proceed to decision block 310 where it determines whether the BIOS intelligent service detects a trigger event. If the BIOS intelligent service detects the trigger event, then the "YES" branch is taken and the method proceeds to block 315. If the BIOS intelligent service does not detect the trigger event, then the "NO" branch is taken and the method ends.

At block 315, the BIOS intelligent service may scan the EFI system partition for one or more BIOS recovery files and/or BIOS recovery file paths. BIOS intelligent service may also scan the EFI system partition for BIOS firmware images and/or associated file paths. The method may proceed to decision block 320 where the BIOS intelligent service may determine whether one or more of the aforementioned files or file paths is missing. If a file or file path is missing, then the "YES" branch is taken and the method proceeds to block 325. If no file or file path is missing, then the "NO" branch is taken and the method ends.

At block 325, the BIOS intelligent service may determine information associated with the missing BIOS recovery file, BIOS firmware image, and/or associated file paths. For example, the BIOS intelligent service may determine a firmware resource version, firmware resource entry array class GUID, firmware version, firmware type, etc. The method may proceed to block 330, where the BIOS intelligent service may create an entry in an EFI system resource table for the missing file and/or file path. For example, the BIOS intelligent service may create an entry of a BIOS recovery file GUID as a "boot device recovery firmware update" in the EFI system resource table.

Figure 4:
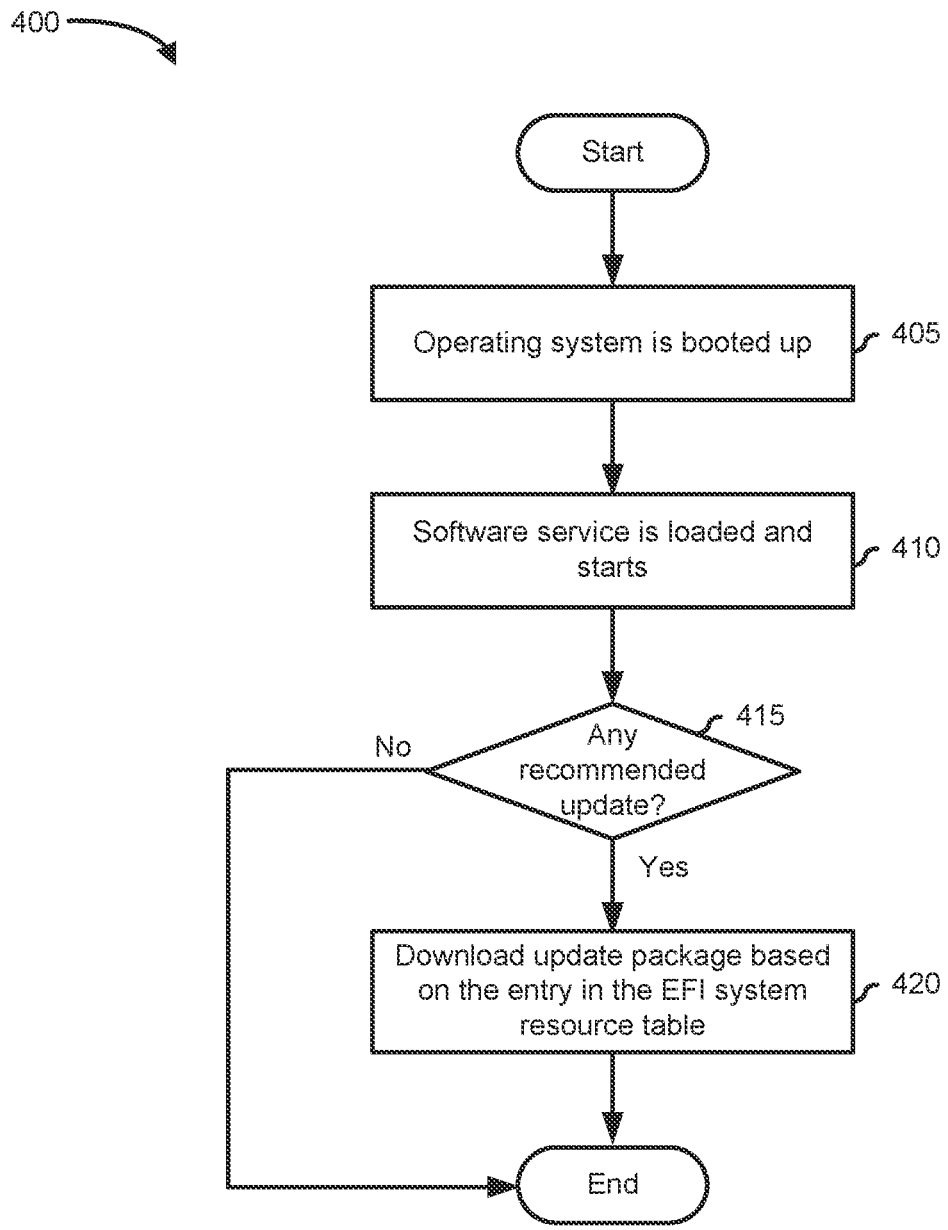
FIG. 4 is a flowchart of a method for automated system recovery and execution of remediation events, according to an embodiment of the present disclosure.

FIG. 4 shows a flowchart of a method 400 automated system recovery and execution of remediation events. Method 400 may be performed by one or more components of information handling system 200 of FIG. 2. For example, one or more blocks of method 400 may be performed by operating system 220 and/or software service 225. However, while embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

The method typically starts at block 405 when an operating system is booted up. For example, the BIOS has finished the initialization process and the system boot is handed off to the operating system. The operating system may enumerate a separate plug-and-play device instance for each entry of a firmware resource in the EFI system resource table. For example, one plug-and-play device may be associated with a BIOS recovery file and another plug-and-play device may be associated with a BIOS firmware image. The method proceeds to block 410 where a software service may load and start. The operating system or the software service may then verify that each of the plug-and-play device instances is created correctly by scanning a device manager.

The method may proceed to decision block 415 where the software service may determine if there is a recommended update for the plug-and-play device instances. The software service may query the EFI system resource table to determine whether any update is recommended, such as for a firmware resource, by checking if there is an entry in the table. If there is a recommended update, then the "YES" branch is taken and the method proceeds to block 420. If there is no recommended update, then the "NO" branch is taken and the method ends.

The method may proceed to block 420, where the software service may orchestrate an update package, such as a firmware update package, for the plug-and-play device instance. For example, the software service may retrieve the update package locally, such as from a peripheral device at a docking station, system memory, or a storage device. If there is no file available locally for the update package, then the software service may download one or more update packages.

Although FIG. 3, and FIG. 4 show example blocks of method 300 and method 400 in some implementations, method 300 and method 400 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 400 may be performed in parallel. For example, blocks 405 and 410 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   scanning, by a processor, an extensible firmware interface system partition for a file path;
   if the file path is missing, then determining information associated with the file path; and
   adding an entry in an extensible firmware interface system resource table based on the information associated with the file path.

2. The method of claim 1, wherein the file path is associated with a basic input/output system recovery file.

3. The method of claim 1, further comprising determining whether the extensible firmware interface system resource table includes the entry.

4. The method of claim 1, further comprising if the extensible firmware interface system resource table includes the entry, then download an update package based on the entry.

5. The method of claim 1, wherein the scanning of the extensible firmware interface system partition is performed during a power-on self-test.

6. The method of claim 1, wherein the entry includes a globally unique identifier.

7. The method of claim 1, further comprising enumerating a plug-and-play device instance for a firmware resource in the extensible firmware interface system resource table.

8. The method of claim 7, further comprising verifying that the plug-and-play device instance is created correctly.

9. The method of claim 7, further comprising downloading a firmware update package for the plug-and-play device instance.

10. An information handling system, comprising:
    a processor; and
    a memory storing code that when executed causes the processor to perform operations including:
        scanning an extensible firmware interface system partition for a file path;
        if the file path is missing, then determining information associated with the file path; and
        adding an entry in an extensible firmware interface system resource table based on the information associated with the file path.

11. The information handling system of claim 10, wherein the file path is associated with a basic input/output system recovery file.

12. The information handling system of claim 10, wherein the operations further comprise determining whether the extensible firmware interface system resource table includes the entry.

13. The information handling system of claim 10, wherein the operations further comprise if the extensible firmware interface system resource table includes the entry, then download an update package based on the entry.

14. The information handling system of claim 10, wherein the scanning of the extensible firmware interface system partition is performed during a power-on self-test.

15. The information handling system of claim 10, wherein the operations further comprise enumerating a plug-and-play device instance for a firmware resource in the extensible firmware interface system resource table.

16. A non-transitory computer-readable medium to store instructions that are executable to perform operations comprising:
    scanning an extensible firmware interface system partition for a file path;
    if the file path is missing, then determining information associated with the file path; and
    adding an entry in an extensible firmware interface system resource table based on the information associated with the file path.

17. The non-transitory computer-readable medium of claim 16, wherein the operations further comprise enumerating a plug-and-play device instance for a firmware resource in the extensible firmware interface system resource table.

18. The non-transitory computer-readable medium of claim 17, wherein the operations further comprise verifying that the plug-and-play device instance is created correctly.

19. The non-transitory computer-readable medium of claim 17, wherein the operations further comprise downloading a firmware update package for the plug-and-play device instance.

* * * * *